R. S. ROWLAND.
ALFALFA DRIER.
APPLICATION FILED AUG. 7, 1908.
928,541.
Patented July 20, 1909.
3 SHEETS—SHEET 3.
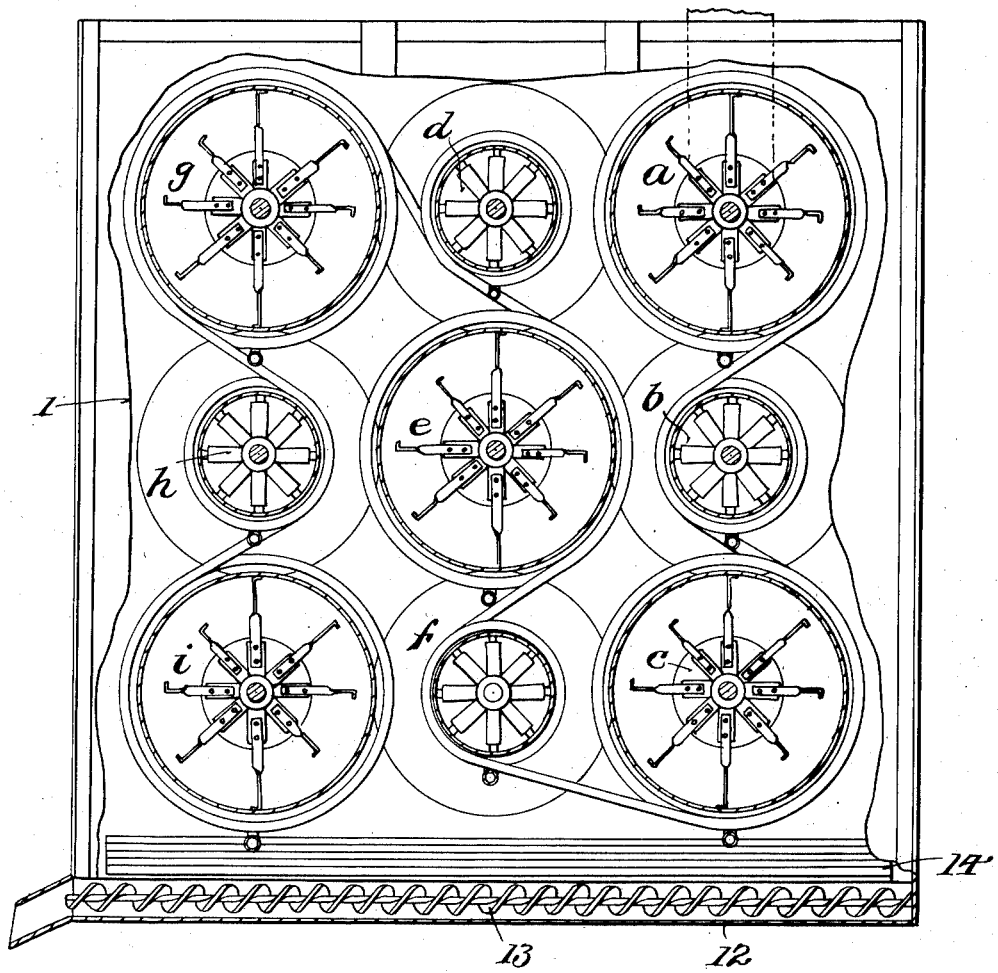
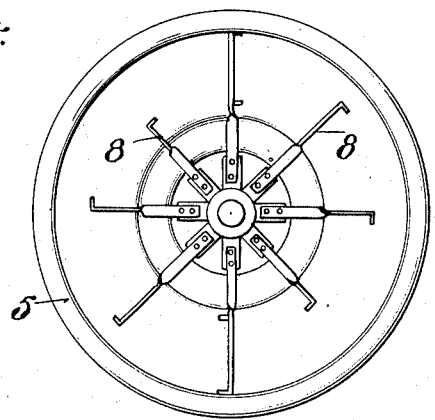
Witnesses
Inventor
R. S. Rowland
By
Lacey, Attorneys

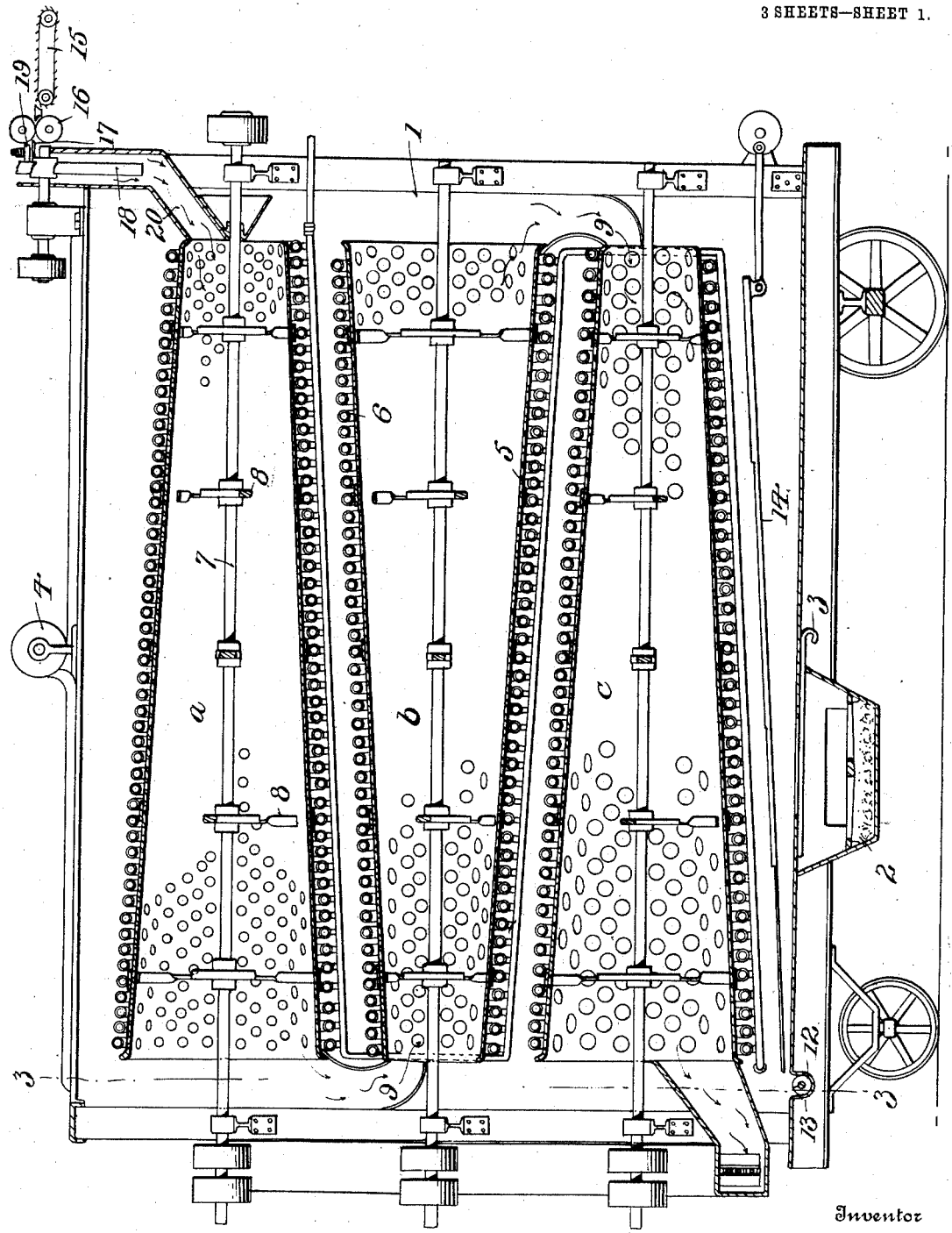

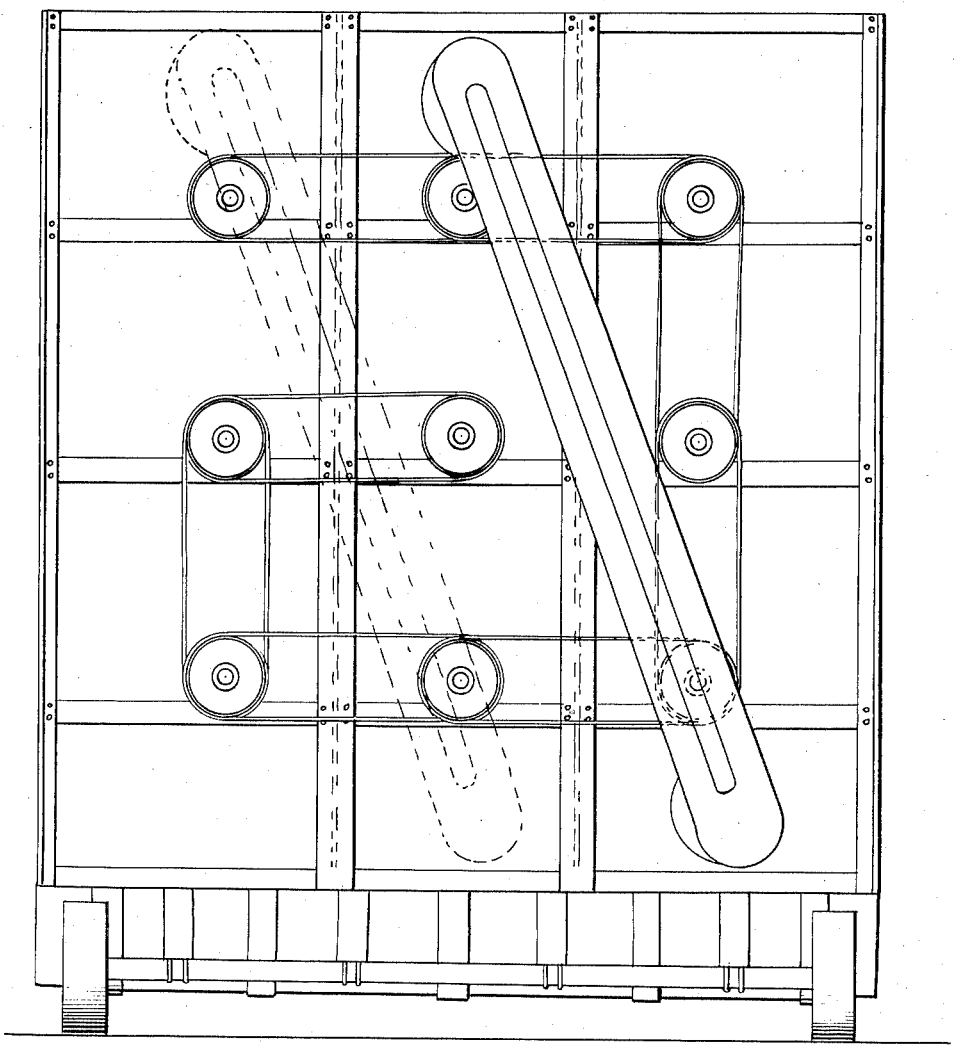

UNITED STATES PATENT OFFICE.

ROBERT S. ROWLAND, OF OKLAHOMA, OKLAHOMA.

ALFALFA-DRIER.

No. 928,541.           Specification of Letters Patent.           Patented July 20, 1909.

Application filed August 7, 1908. Serial No. 447,461.

*To all whom it may concern:*

Be it known that I, ROBERT S. ROWLAND, citizen of the United States, residing at Oklahoma city, in the county of Oklahoma and State of Oklahoma, have invented certain new and useful Improvements in Alfalfa-Driers, of which the following is a specification.

The present invention provides a novel machine for preparing alfalfa or other grass or hay for the market without detracting from its appearance or nutritive qualities and enabling the same to be kept or stored for a reasonable length of time without deteriorating.

The machine in its organization embodies a cutting mechanism for reducing the alfalfa or like material into short lengths, and a series of drier elements for removing moisture from the material without affecting its color or food qualities.

For a full understanding of the invention and the merits thereof and also to acquire a knowledge of the details of construction and the means for effecting the result, reference is to be had to the following description and accompanying drawings.

While the invention may be adapted to different forms and conditions by changes in the structure and minor details without departing from the spirit or essential features thereof, still the preferred embodiment is shown in the accompanying drawings, in which:

Figure 1 is a vertical longitudinal section of a machine embodying the invention. Fig. 2 is a rear view of the machine. Fig. 3 is a transverse section on the line 3—3 of Fig. 1. Fig. 4 is an end view of a drum.

Corresponding and like parts are referred to in the following description and indicated in all the views of the drawings by the same reference characters.

The machine is mounted upon a truck so that it may be readily transported from place to place. The drier elements are suitably housed, being located within a casing 1 which is preferably of metal, stiffened and strengthened by bars. A furnace 2 is located beneath the casing and a slide 3 controls an opening by means of which direct communication is had between the furnace and the casing. An exhaust fan 4 has connection with the upper portion of the casing to draw off the moist and damp air and to create a positive circulation through the casing and the drier elements.

A series of drier elements are arranged within the casing and are disposed in vertical and horizontal rows and are adapted to discharge the material from one into the other so that in the operation of the machine the green material fed to the first drier element passes through the series of drier elements and is discharged from the last drier element in marketable form. The drier elements are of tapered form and their axes have a horizontal and parallel arrangement and as a result the lower portions of the drier elements incline to the horizontal, thereby causing the material to feed thereover automatically by gravitative force. The drier elements have an alternate arrangement, that is, they are placed with the small end of one drier element opposite the larger ends of the adjacent drier elements, such arrangement economizing space as well as serving to feed the material through the casing in a zigzag or backward and forward path. In the construction illustrated, nine drier elements are employed and are arranged in three vertical and horizontal lines and are designated, respectively, by the reference characters $a$, $b$, $c$, $d$, $e$, $f$, $g$, $h$ and $i$. Each drier element is of like formation comprising a drum 5 and a heating coil 6 encircling the drum. The drum, as well as the heating coil tapers throughout its length. The heating coils are connected in series and are adapted to be connected in any suitable manner with a steam boiler, not shown, or other source of steam supply. The heating coils are stationary, whereas the drums are mounted to rotate. A shaft 7 passes axially through each drum and is connected with the latter at intervals in its length by means of arms 8, the latter varying in length according to their position and the distance between the shaft 7 and the opposing parts of the drum to which the arms are attached. The shafts 7 are mounted at their ends in bearings fitted to the walls of the casing. The topmost drum of each vertical line of drier elements is adapted to discharge the material at the outer end into the uppermost end of the drum next below, and the middle drum is adapted to discharge the material from its outer end into the smaller end of the lowermost drum. Spouts 9 are provided to convey the material from one drum to the drum next below, as shown most clearly in Fig. 1. An elevator 10 conveys the material from the lowest drum c of the first series to the top drum d of the second series and an elevator 11 conveys the material from the lowest drum f of the second series to the topmost drum g of the third series, the bottom drum of the last series discharging into a trough 12 extending transversely of the casing at the lower and rear side and discharging at one end therefrom. A conveyer 13 is arranged to move the material through the trough 12 and is of the screw type. The several drums are perforated, the openings being smallest in the topmost drums, larger in the middle drum and still larger in the lowest drums. The perforations admit a free passage of the hot air through the sides of the drums and also provide an unobstructed passage for the escape of the moisture driven off from the material. A riddle or pan 14 is located in the lower portion of the casing below the series of driers and is adapted to have a reciprocating motion imparted thereto. The pan or riddle inclines from front to rear and is adapted to discharge the material escaping through the openings in the sides of the drums into the trough 12. To facilitate the feed of the material over the pan or riddle, the same is jogged or stepped upon its upper surface. Any suitable means may be employed for imparting a reciprocating movement to the pan or riddle.

The alfalfa, grass, hay or other material is fed to the machine by means of an endless conveyer 15. A pair of suitable feed rolls 16 is located at the inner end of the endless conveyer 15 and grips the material as the latter passes between them, and positively advances the same over a table 17 to a rotary cutter 18, which latter may be of any variety commonly employed for cutting fibrous material, such as hay or grain, into short lengths or feed. A pressure plate 19 is located above the table 17 and its outer edge curves upwardly.

The operation of the machine is manifest from the foregoing detail description, it being obvious that the material, when cut, passes through a spout 20 into the small end of the first drum a of the series and after making the circuit of each of the drums in succession, the material is finally discharged from the machine through the trough 12 in marketable form, the material possessing the color and nutritive qualities in the same degree as prior to treatment.

Having thus described the invention, what is claimed as new is:

1. In a machine of the character described, the combination of a hollow rotary drier element adapted to have material pass therethrough, and a riddle disposed below and adapted to catch material escaping from the drier element.

2. In a machine of the character described, the combination of a casing provided with a conveyer for ejecting material therefrom, a drier element mounted within the casing and adapted to discharge material into the conveyer, and a riddle disposed below and arranged to catch material escaping from the drier element and to conduct such material to the conveyer.

3. In a machine of the character described, the combination of a casing provided with a trough, a drier element mounted in the casing and adapted to have material pass therethrough and to discharge the same into the trough, and a riddle disposed below the drier element and inclined toward the trough and arranged to catch material escaping from the drier element and to discharge the same into the trough.

4. In a machine of the character described, the combination of a casing provided with a trough, a series of drier elements located within the casing and adapted to have material pass therethrough in successive order, one of the drier elements being arranged to discharge material into the trough, and a screw conveyer mounted in the trough to positively eject material from the casing.

5. In a machine of the character described, the combination of a series of rotary drier elements adapted to have material pass therethrough in successive order, and a plurality of heating coils connected in series and within which the respective drier elements are rotatably mounted.

6. In a machine of the character described, the combination of a casing, a series of drier elements located within the casing, a conveyer at one end of the lower portion of the casing, and a riddle in the lower portion of the casing below the drier elements and adapted to discharge into the said conveyer.

In testimony whereof I affix my signature in presence of two witnesses.

ROBERT S. ROWLAND. [L. S.]

Witnesses:
   Jno. R. Harris,
   A. R. Turner.